United States Patent [19]

Ericsson

[11] Patent Number: 5,628,280
[45] Date of Patent: May 13, 1997

[54] OYSTER CLEANSING/PURIFICATION ARRAY

[76] Inventor: John D. Ericsson, P.O. Box 6211, Gulf Breeze, Fla. 32561

[21] Appl. No.: 413,166

[22] Filed: Mar. 29, 1995

Related U.S. Application Data

[63] Continuation-in-part of Ser. No. 189,335, May 18, 1994, Pat. No. 5,438,958, which is a continuation-in-part of Ser. No. 15,484, Nov. 18, 1993, Pat. No. Des. 362,508.

[51] Int. Cl.$^6$ ................................................ A01K 61/00
[52] U.S. Cl. .................................. 119/239; 119/238
[58] Field of Search .................................. 119/208, 223, 119/238, 239, 240

[56] References Cited

U.S. PATENT DOCUMENTS

| | | |
|---|---|---|
| 2,989,945 | 6/1961 | Ford . |
| 3,499,421 | 3/1970 | MacDonald et al. ................ 119/208 |
| 3,641,982 | 2/1972 | Woodridge et al. ................ 119/243 |
| 3,702,599 | 11/1972 | Herolzer ........................... 119/241 |
| 3,741,159 | 6/1973 | Halaurbrenner ................... 119/239 |
| 3,901,190 | 8/1975 | Wiegardt, Jr. ...................... 119/237 |
| 3,929,100 | 12/1975 | Thomas et al. .................... 119/208 |
| 3,933,124 | 1/1976 | Ledoux et al. .................... 119/208 |
| 3,963,125 | 6/1976 | Aggott .............................. 211/126 |
| 4,266,509 | 5/1981 | Gollott et al. .................... 119/208 |
| 4,337,727 | 7/1982 | Mickelsen et al. ................ 119/208 |
| 4,537,149 | 8/1985 | Ryan ................................ 119/243 |
| 4,653,429 | 3/1987 | Murphy ........................... 119/243 |
| 4,793,284 | 12/1988 | Davis ............................... 119/243 |
| 5,095,851 | 3/1992 | Bourg .............................. 119/223 |
| 5,186,121 | 2/1993 | Smith, Jr. ......................... 119/243 |
| 5,249,548 | 10/1993 | Dupuy ............................. 119/243 |

FOREIGN PATENT DOCUMENTS

| | | | |
|---|---|---|---|
| 80414 | 6/1983 | European Pat. Off. | ............... 119/223 |
| 2649293 | 1/1991 | France | ................... 119/240 |

Primary Examiner—Robert P. Swiatek
Attorney, Agent, or Firm—Joseph T. Regard, Ltd.

[57] ABSTRACT

An oyster and other molluscan cleansing system suitable for purifying, or promoting the growout of, for example, oysters, clams, mussels, or the like. The preferred embodiment of the present invention teaches a system wherein there is provided a central platform/support structure from which uniformly emanates a plurality of stacked rack-support structures, that in turn have therein generally horizontally-situated, vertically-stacked tiers of molluscan support racks. The present invention as implemented teaches a system particularly suitable for use in open water, as the structure is configured to be implemented in a variety of underwater environments, including salt, brackish, and fresh water, as desired, depending upon the species utilized therewith. In addition to flexibility from an environmental standpoint, the present system is configured to allow quality-control monitoring of the species during the cleansing or growout process, having the capability to monitor access to the system and determining the tampering thereof. The present system contemplates a ballastable, generally vertical support column, which is of adequate volume to provide variable buoyancy to the system as needed for raising or lowering the system during deployment and retrieval operations, respectively. The multi-tiered, arrayed system is configured in such a manner as to provide maximum efficiency for supporting the shellfish trays, allowing for full and free circulation of water flow to aid in the cleansing/purification, or growout process, while providing a system that is relatively compact and manageable.

20 Claims, 6 Drawing Sheets

5,628,280

OYSTER CLEANSING/PURIFICATION ARRAY

The present application is a continuation-in-part of U.S. Ser. No. 189,335, now U.S. Pat. No. 5,438,950, filed May 18, 1994, which said application is a continuation-in-part of U.S. design patent application Ser. No. 29/015484, filed Nov. 18, 1993, now U.S. Pat. No. D362,508.

BACKGROUND OF THE INVENTION

Invention Field

The present invention relates to mariculture systems, and more particularly to an oyster and other molluscan cleansing system suitable for purifying, for example, oysters, clams, mussels or the like. The preferred embodiment of the present invention teaches a structure wherein there is provided a central platform/support structure from which uniformly emanates a plurality of stacked rack support structures, which in turn have therein, generally horizontally situated, vertically stacked tiers of shellfish support trays.

The present invention as implemented teaches a structure particularly suitable for use in open water, as the structure is configured to be implemented in a variety of underwater environments, including salt, brackish, and fresh water, as desired, depending upon the species utilized therewith.

In addition to flexibility from an environmental standpoint, the present system is configured to allow quality control monitoring of the molluscan species during the natural cleansing or purification process, having the capability to monitor access to the system and determining the tampering thereof.

The present system contemplates a ballastable, generally vertical support column, which is of adequate volume to provide variable buoyancy to the system as needed for transport or harvesting operations. The multi-tiered, arrayed system is configured in such a manner as to provide maximum efficiency for supporting the shellfish trays, allowing for full and free circulation of water flow to aid in the purification process, while providing a system which is relatively compact and manageable.

Alternatively, the present invention provides a highly satisfactory environment for oyster growout, wherein immature oysters, or spats, are placed in quantity upon the trays, the trays loaded into the rack system, the racks system engaged to the platform/support structure, all of which is then deposited into a marine environment for a period of time for growout.

GENERAL BACKGROUND DISCUSSION

While various apparatuses have been utilized for centuries for accomplishing mariculture in various forms, none has particularly taught or contemplated the particular system of the present invention.

Patents that may be of general interest are cited as follows:

| Patent Number | Inventor(s) | Date of Issue |
|---|---|---|
| 4266509 | Gollott et al. | 05/21/1981 |
| 3901190 | Weigardt, Jr | 09/26/1975 |
| 3702599 | Heroizer | 11/14/1972 |
| 2909945 | Ford | 06/27/1961 |
| 5249548 | Dupuy | 10/05/1993 |

-continued

| Patent Number | Inventor(s) | Date of Issue |
|---|---|---|
| 5186121 | Smith, Jr. | 02/16/1993 |
| 5095851 | Bourg | 03/17/1992 |
| 4793284 | Davis | 12/27/1988 |
| 4653429 | Murphy | 03/31/1987 |
| 4537149 | Ryan | 08/27/1985 |
| 4337727 | Mickeisen et al. | 07/06/1982 |
| 3963125 | Baggott | 05/15/1976 |
| 3933124 | Ledoux et al. | 01/20/1976 |
| 3929100 | Thomas et al. | 12/30/1975 |
| 3641982 | Woodridge | 02/15/1972 |

U.S. Pat. No. 3,702,599 issued in 1972 to Herolzer teaches a Shellfish Growout Tray system wherein there is taught compartmented, removable tray containers for bivalve mollusks for cleansing/purification. Note that this patent teaches a retaining strap (62) for holding the vertically-situated trays in place.

U.S. Pat. No. 3,901,190 issued in 1975 teaches an oyster system also contemplating a series of vertically-stacked trays (FIGS. 7 & 8) with a retainer strap to prevent said trays from inadvertently sliding from the tray racks. U.S. Pat. No. 2,989,945, issued in 1961 also contemplates a set of vertically-stacked trays for growing oysters (FIG. 7).

U.S. Pat. No. 4,226,509, issued in 1981 to Gollott teaches an oyster purification system which likewise contemplates a vertical stack of trays, this system teaching the tray cavities (claim 2) "being vertically spaced apart approximately 2 inches more than the depth of said trays...," or greater than two inches apart (claim 4), with the trays being able to be locked in place to prevent theft.

Containerized relaying of oysters for purification was attempted in the Mississippi Sound utilizing the Gollott apparatus with limited commercial success during the 1980s (Supan & Cake, 1982; Supan, 1988; Richard Gollott. Golden Gulf Coast Packing Company, Biloxi. Miss.; personal communication). The oysters successfully purged and laboratory tests confirmed the cleansing; however, capital funding problems, resistance from private oyster fishermen, and the tragic sinking of the dredge/transport barge and the loss of its captain ended Richard Gollott's containerized-relaying efforts.

Algerian oyster and mussel farmers have pioneered the use of a ballastable shellfish culture device, the "Soucoupe Balastable" (literally a ballasted saucer). As of October 1990 more than 60 of the soucoupes were to be used for rearing 200 to 300 metric tons of European mussels and flat oysters (almost 100 times the 1988 production from the same area using traditional bottom and suspension-culture methods) (Zemmouri, 1990). The device is loaded in shallow, shellfish-growing areas, towed to deeper and saltier growing areas, and ballasted down to the bottom for grow-out of the containerized shellfish.

The soucoupe system has a structural configuration which, however, provides limitations as to the flexibility of use. For example, the soucoupe system, although not particularly disclosed in any known publications, is understood by the inventor as comprising a generally saucer-configured, one-piece structure that is suggested as having access to the mollusks from openings about the periphery of the system. Thus, the mollusks would be exposed via the open access areas to predators and could apparently be dislodged from the containers if the system tipped, or under high current situations, or due to vandalism.

Oyster contamination and cleansing have been the subject of considerable research and field tests in Mississippi (Ellender et al., 1980a, 1980b; Cook et al., 1982; Supan & Cake, 1982). The U.S. Food and Drug Administration and the State of Mississippi, through the National Shellfish Sanitation Program (USFDA, 1988), permit the relaying of contaminated oysters from "restricted" to "approved" growing areas during a mandatory 14-day self-purification period. Cook et al. (1982) prepared guidelines for oyster relaying in the Gulf of Mexico.

Containerized relaying (Supan & Cake, 1982; Supan, 1988) and on-bottom relaying (Burrage et al., 1991) are viable methods for near-shore cleansing of oysters in Mississippi Sound. Oyster relaying has been recommended as a means of increasing oyster production Gulf-wide (Berrigan et al., 1991; Richard Leard, Gulf States Marine Fisheries Commission, Ocean Springs, Miss.; personal communication).

As may be discerned by a review of the above and foregoing, it is submitted that the prior art systems have yet to contemplate or suggest an effective system for purification (natural cleansing during relaying), that provides a high production, and is cost-effective, yet sustainable and lasting. This difficulty is based in part on past designs and their inability to cope with the often inhospitable, open-water environment.

SUMMARY OF THE INVENTION

The present invention overcomes these prior art problems by providing a system that is particularly configured for large-scale, open-water aquaculture or mariculture, teaching a system which supports mariculture purification and cleansing from introduction to harvesting in a structure which can survive even severe weather conditions.

The present, searched-for invention comprises a Molluscan Shellfish Cleansing/Purification System comprising an elongated, vertically-situated, multi-faceted, column structure having situated laterally thereon a series of stacked cages therein.

The present system is configured to utilize oyster resources from "restricted" growing areas and/or "conditionally closed areas" that can be harvested (under state supervision), transferred to "approved" waters, and purified or naturally cleansed, via containerized relaying. Since most of the "polluted" oysters will come from lower-salinity waters, their "salty flavor" may be enhanced during relaying thereby increasing their inherent value and market demand.

The Gulf of Mexico region, and more specifically the Mississippi Sound and adjacent bays have vast oyster reefs that are not regularly harvested because of pollution or are lost due to the infusion of fresh water before the "restricted" oyster reefs can be opened. As a result, 100,000 to 200,000 sacks of Mississippi oysters are lost every year, at a lost value of $1.5 to $3.0 million per year in oyster sales.

The present invention is configured primarily for utilization in the Gulf of Mexico oyster industry, providing a commercially-viable, cost-competitive, oyster-culture and cleansing system that can be used to harvest, purify, growout, and otherwise prepare for market highly-desirable oysters from "restricted" oyster reefs that are normally not available to the seafood market or are lost to periodic fresh water flooding.

The microbial quality of shellfish growing waters along all of the nation's coastlines is steadily declining as a result of increased coastal and near-coast population increases and the concomitant increases from point and nonpoint discharges of domestic, industrial, and agriculture pollutants. As an oyster is a natural filter, processing over a barrel of water a day, toxins from polluted waters are retained and concentrated by the oyster, making it unsuitable for consumption without purification.

As a result of diminished water quality large oyster-producing areas have been reclassified from "approved" to "conditionally approved," "restricted," and "prohibited" based on the presence of bacterial indicator organisms (Broutman & Leonard, 1988). Of Mississippi Sound's 483,678 acres, only 76,888 acres (15.9%) are now classified as "approved" 120,083 acres (24.8%) are "conditionally approved" (based on rainfall and land runoff); 189,958 acres (39.3%) are "conditionally restricted," and the remaining 96,749 acres (20.0%) are classified as "prohibited" (Broutman & Leonard, 1988). The majority of the productive oyster reefs occur in the "conditionally managed" areas (total: 310,041 acres [64.1%]).

Mississippi's commercial oyster harvests averaged 81,000 sacks per year in the 1980s and ranged from a high of 366,000 sacks in 1983 to a low of 5,000 sacks in 1984. The annual harvests have declined drastically to an average of 14,300 sacks per year in 1990 and 1991. This 570% decline resulted from a number of factors including prolonged drought with concomitant saltwater intrusion and increased oyster losses from predation and disease; freshwater flooding from the Mississippi River and coastal rivers; lack of state funding to collect and replant processed oyster shells on the natural reefs; and closure of polluted areas.

An estimated 200,000 sacks of commercial oysters could be harvested annually from "restricted" areas In Mississippi's coastal bays if cleansing/purification and/or relaying operations were permitted. At the average 1992 value of $15 per sack those 200,000 sacks represent a $3 million resource.

If those 200,000 sacks of oysters were cleansed via on-bottom and/or containerized relaying, the Mississippi industry and the participating oyster fishermen and processors would derive significant economic benefits, especially if the relaying occurred during seasonal harvesting lulls, during lengthy closures of the "conditionally approved" growing areas, and/or prior to flooding events that were predicted to kill significant numbers of oysters in western Mississippi Sound. Burrage et al. (1991) found a final benefit-to-cost ratio of 3.1:1.0 during a 1990–1991 relaying study in Mississippi.

The State of Mississippi has lost most of its natural oyster industry because pollution has closed 80% of its native oyster reefs. As a result, over harvesting of oysters from nonpolluted waters has diminished oyster production to dangerous levels and thus threatens the survival of the entire Mississippi Oyster Industry.

Recently, Mississippi's annual oyster harvests have declined drastically from a high of 366,000 sacks in 1983; 87,000 in 1985; 53,000 in 1986; 24,000 in 1987; 22,000 in 1988; 22,000 in 1989; to lows of 15,778 sacks in 1990 and 12,824 sacks in 1991. The results of water pollution and strict Federal enforcement guidelines on natural oyster harvests have taken their toll in the loss of millions of dollars in regional oyster harvests and sales.

The annual harvesting and marketing of the Gulf oysters has a very unstable supply history. State oyster reefs open and close for a few months during each year based on oyster size, estimated yield, and water-pollution levels.

The current oyster demand is variably supplied by wild-caught oysters from all Gulf States as well as from Chesapeake Bay (VA & MD) and by bottom-cultured oysters from Louisiana and Texas as well as from Puget Sound (WA). At times the wild stocks are unavailable because of pollution or seasonal factors and/or low production.

The areas of "approved growing waters" are decreasing annually as domestic, industrial, and agricultural pollutants encroach into the natural oyster growing areas. Concomitantly, saltwater intrusion into traditional growing areas is causing increased prevalence of oyster pathogens, pests, and predators thereby further limiting oyster production.

Cleansing of polluted oysters from "restricted growing waters" can be accomplished via "controlled purification" or depuration (in onshore facilities) or via relaying (into "approved growing areas"). All of these sources of oysters (wild, cultured, and cleansed) compete from time-to-time and from place-to-place depending on market conditions and seasonal demands.

The present invention comprises a lower platform pad of concrete or the like, providing a generally flat base, said pad having centrally emanating therefrom, in generally vertical fashion, a ballast/engagement column which is configured to removably accept about its periphery a plurality of generally vertically-tiered, tray-rack modules, each tray-rack module configured to accept in generally uniformly spaced, horizontal fashion a plurality of oyster trays.

The preferred embodiment of the present invention contemplates said oyster trays as being constructed of polystyrene or the like, and being permeated to allow the passage of water therethrough.

In selecting an appropriate purification or relaying site, physio-chemical parameters (e.g., oxygen content, salinity, temperature, & turbidity of the water; ambient sedimentation rates; relative position of the unit vis-a-vis the mooring location, etc.) should be carefully weighed and considered.

In use, the present system will be towed or otherwise conveyed to the desired purification area, ballasted to the bottom, marked with an approved surface buoy, and left on location, for example, 14 days. In some circumstances, it may be desirable to anchor the system with, for example, a four-point mooring system. The position and condition of the unit and its cages may be observed over time, as desirable, via SCUBA diving. If SCUBA-diver observations of the deployed shellfish unit and/or surface inspections of the unit show that design or operational changes are required, the unit will be towed ashore for reconfiguring, etc.

The oysters will be harvested from the contaminated oyster beds under Department of Marine Resources-approved operating conditions, which oysters will then be cleansed or purified, selectively tested, and provided for public consumption upon full purification or controlled cleansing.

The present invention also contemplates the utilization of the apparatus of the present invention for growout of immature oysters, or spats. In such a utilization, the quantities of spats are placed in quantity upon the trays, the trays loaded into the rack system, the racks system engaged to the platform/support structure, all of which is then deposited into a marine environment for a period of time for growout.

The female oyster can produce up to half a billion eggs in a single season, but only about one egg in four million will reach maturity in the wild. Following five to ten hours from fertilization, the individual, fertilized eggs form into spats, which comprise free-swimming, self sustaining larva, which is able to propel itself utilizing cilia, or moving hairs about the periphery of the larva. After about the two weeks, the larva then sets to a stationary object, a process known as setting or striking. The present system's growout embodiment would set or strike the spats during this period to the growout trays, preferably (but not necessarily exclusively) in the lab, and then transport the trays to the growout apparatus, load said trays therein, and deposit the system into a desirable marine environment for growout, which can last, as an example, about one year or a little longer, depending upon a number of factors, including the species of oyster or molluscan, water temperature or salinity, purity, and food concentration of the water.

While the present system may take a spat to an edible oyster in about, for example, one year; this is compared to wild oysters, which typically take three to five years to mature to market size.

Thus, the system of the present invention is configured for sustaining oysters and other molluscans, which can include cleaning, purifying, growout, or simply storing and maintaining live molluscans.

It is therefore an object of the present invention to provide a cost-effective, containerized, modular, oyster cleansing or relaying system that will permit the harvesting and utilization of contaminated oyster stocks from "restricted growing areas."

Another object of the present invention is to provide an oyster grow-out system for enhancing the saline flavor of oysters for the raw-stock trade, and for rapid grow-out of near-commercial-size seed oysters.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE FIGURES

Figure 1:
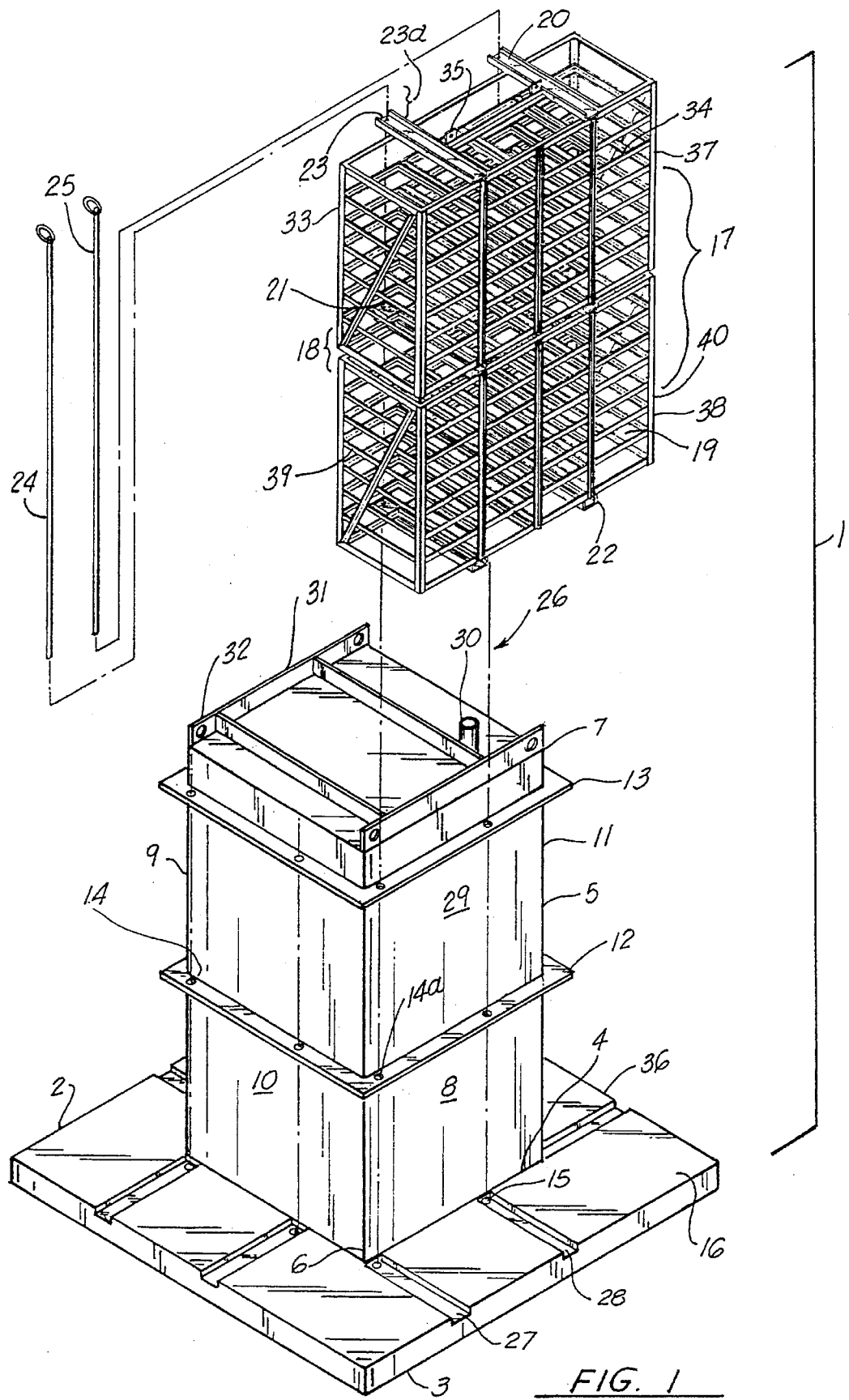
FIG. 1 is an isometric, exploded view of the preferred embodiment of the Oyster Cleansing/Purification System of the present invention, illustrating the central pad and base column of the present invention, and the vertical cage arrays emanating therefrom, as well as the connection rods for securing the cages to the base column.

Referring to FIG. 1, the oyster cleansing/purification, and/or growout system 1 of the present invention comprises a platform/support structure 2 designed to engage and support a plurality of stacked, aligned, tray racks 17 about a support column 5.

As shown, the platform/support structure 2 comprises in the preferred embodiment a lower, generally horizontally-situated, flat and rectilinear support pad 3 fabricated of reinforced concrete, or any other sturdy and generally dense material. Emanating from the medial, upper surface 4 of the support pad is a generally vertically-situated support column 5 of steel, aluminum, or the like, the support column having an upper end 7 and a lower end 6, and front 8 and rear 9 outer walls, as well as first 10 and second 11 side outer walls generally aligned with the edges 36 of the support pad 3.

Situated about the upper and medial areas of the front, rear, and side walls of the support column 5 are upper 13 and medial 12 engagement members, respectively, each having engagement apertures 14 generally vertically aligned relative the upper and medial engagement members, said apertures, configured each to engage a rod 24, as will be more fully explained infra. Further, the support pad 3 has formed therein engagement apertures 15, each of said apertures likewise situated in general vertical alignment with respective apertures formed in the medial 12 and upper 13 engagement members.

The support pad 3 is preferably sized relative to the support column 5 such that a shelf or supporting area 16 emanates from the lower peripheral area of the support column 5, ideally of at least generally a size comparable to the depth and width of the tray racks 17 to be supported, which tray racks are situated thereto during the purification/cleansing, or growout operation.

Continuing with FIG. 1, the tray racks 17 may be stacked and engaged 18 to form upper 37 and lower 38, generally vertically- and horizontally-aligned racks configured to support a plurality of tray supports 19 for holding trays of molluscans, such as, for example, oysters.

The tray racks 17 have first 39 and second 40 side walls, and a frontal, open, engaging face 33, which allows the passage of trays therethrough to their respective tray supports, when the racks are separated from the platform/support structure, the racks further including a closed, rear wall 34, which prevents the loaded trays from slipping therethrough. The upper end of the tray racks further includes a lifting padeye 35 or padeyes for lifting the system using a cable or the like.

Situated at the upper, medial, and lower areas of the assembled upper 37 and lower 38 racks forming the tray racks 17 are first and second, upper 20, medial 21 and lower 22, generally vertically-aligned sets of engagement brackets, the upper 20 and medial 21 engagement brackets being configured to respectively engage the upper 13 and medial 12 engagement members of the support column 5, the lower engagement bracket in the preferred embodiment configured to engage the support pad 3, as well as resting in slots 27, 28 in the support pad configured to accept said lower engagement brackets. Further, in the preferred embodiment of the present invention, the lower engagement bracket is configured to allow the passage of a fork lift fork therethrough for lifting and maneuvering the rack.

As shown, each of the engagement brackets 20, 21, and 22 have a portion emanating through the open face 33 area of the tray rack, with an engagement aperture 23 formed in the projecting portion 23a of the brackets, such that the aperture formed in each of the respective first and second sets of vertically-aligned brackets is likewise aligned.

In the preferred embodiment of the present invention, the tray rack 17 is configured to rest atop the supporting area 16 of the pad emanating from under the support column, with the open face 33 of the tray rack situated to rest generally against one of the exterior walls of the support column In a face-to-face engagement, with, preferably, four tray racks situated to engage each of the four exterior walls in the present, exemplary, square column configuration. It is noted that other configuration columns could work equally as well, including triangular, pentagonal, octagonal, and, utilizing slight variations, circular.

In use, the stacked tray rack 17 is aligned such that its open face is situated in a generally face-to-face arrangement with one of the exterior walls of the support column, in this example, the front wall 8. Next, the engagement apertures formed in the upper, medial, and lower engagement brackets are aligned with respective engagement apertures 14a situated in the upper 13 and medial 12 engagement members, respectively, with the engagement aperture formed in the lower engagement brackets configured to align with respective engagement apertures 15 in the pad.

Figure 1A:
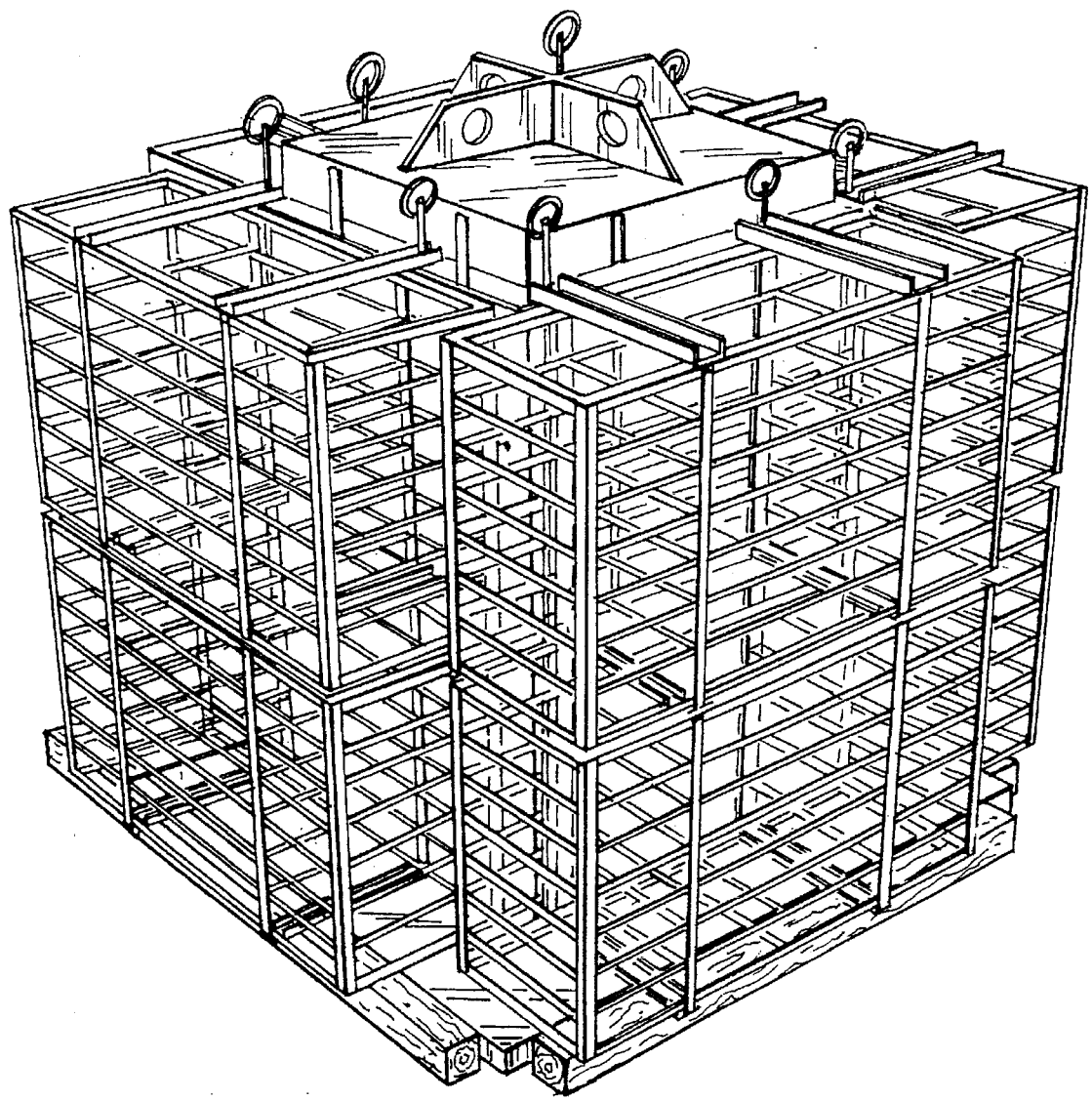
FIG. 1A is an isometric view of the invention of the preferred embodiment of the oyster tray rack of FIG. 1.

Once aligned, first 24 and second 25 securing rods may pass 26 through the aligned apertures of the first and second sets of brackets and their respectively aligned apertures and bracket member apertures, securing the tray rack to the platform/support structure. Once installed, the user may proceed to install second, third, and fourth tray racks, as shown in FIG. 1a. Once fully installed and secured, the open face areas of all of installed tray racks are blocked, either medially via the support column, or via the adjacent sides of neighboring installed cages, preventing the trays from falling out of the rack during the purification/cleansing, or growout period.

Returning to FIG. 1, the body 29 support column 5 of the preferred embodiment of the present invention is preferably fabricated so as to have a fluid impermeable interior cavity forming a ballast chamber, which can be filled with water as desired, or filled with air, via hose bracket 30. Lastly, the upper end of the support column preferably includes a padeye structure 31, having lifting apertures 32 formed therein.

Figure 2:
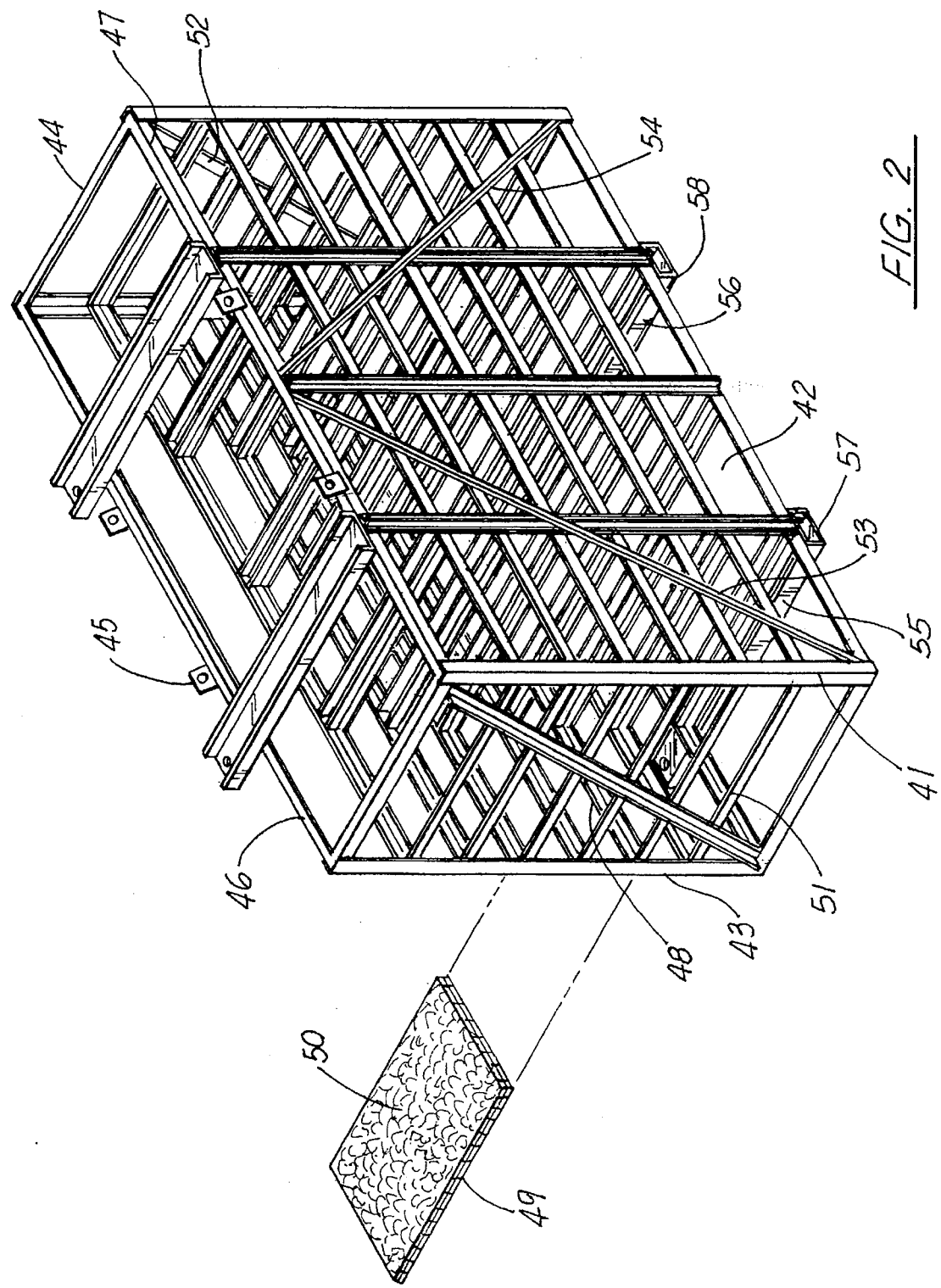
FIG. 2 is an isometric view of the invention of the preferred embodiment of an oyster tray rack of the invention of FIG. 1, illustrating the structure of the rack, as well as the placement of an exemplary molluscan tray therein.

Referring to FIG. 2, the preferred rack 41 design of the present invention includes a rear, inaccessible wall 42, a front, open face 43, an upper end 44 with lifting padeyes 45 situated along the side supports 46, 47, and a plurality of horizontally- and vertically-aligned tray supports 48, configured for accepting and supporting a tray 49 holding thereon a plurality of molluscans 50, such as oysters, clams, mussels, or the like. Preferably, the trays should be of a forminated design, to allow the free flow of water therethrough to allow a enhanced purification or growout of the molluscans.

The present system may further include side-angled 51, 52 and rear-angled 53, 54, support braces, both to enhance the strengthen the racks, as well as prevent the loaded trays from passing therethrough. Lastly, the lower support brackets 55, 56 may have therein open cavities 57, 58 formed therein, said support brackets spaced to allow the passage of a single fork of a forklift through said open cavities, for lifting and maneuvering the rack.

Figure 3:
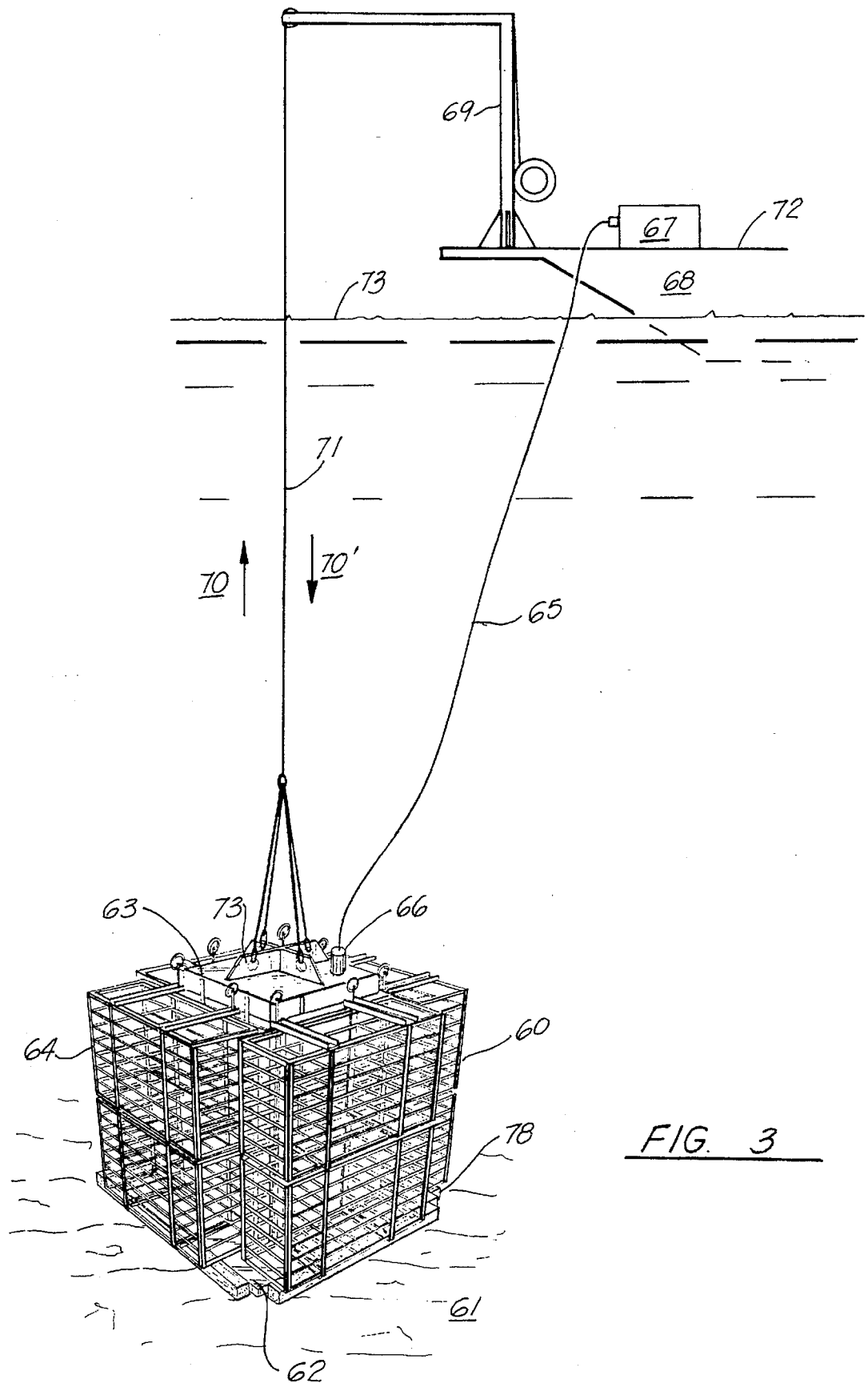
FIG. 3 is a side view of the method of harvesting the oysters from the cleansing cages, illustrating the utilization of a watercraft to lift the pad and column structure from the seabed, lifting the cage array to the deck of the watercraft for harvesting of the oysters, further utilizing compressor means for displacing water ballast in the support column with air, to add buoyancy to the system.

Referring to FIG. 3, in use, the Oyster Purification/Cleansing, or Growout System 60, having trays loaded with molluscans supported by the racks 64, is placed in a body of water 73, such that the support pad 62 rests atop the sea bed 61, the weighty support pad anchoring the structure in place. In high-current situations, additional anchoring via helical or other anchors may be desirable. Returning to FIG. 3, the system may be lowered 70 feet to the sea bed 61 via cable 71. If desired, the support column 63 may have provided therein air for adding buoyancy, and enhancing maneuverability, which air may be selectively vented via hose 65 connected to connection 66, or, alternatively, through the bottom 78 of the column, which may be open, to reduce buoyancy during the installation process. This action could assist recovery as the bottom suction will be broken, due to the displaced water rushing through the open bottom section.

After a predetermined period of time, in which purification or growout of the oysters is expected to occur, a watercraft 68 may hitch to the system via cable 71 hooked to padeyes 73 (an alternative padeye arrangement is shown), and raised 70 via crane. To aid in the raising, a compressor 67 may be utilized to pump air into the support column 63 via connection, the compressed air displacing and venting any water in the column via the open bottom 78, thereby increasing buoyancy. Finally, the crane 69 may be utilized to raise 70 the system from the water 73, placing it upon the deck 72 of the watercraft.

Figure 5:
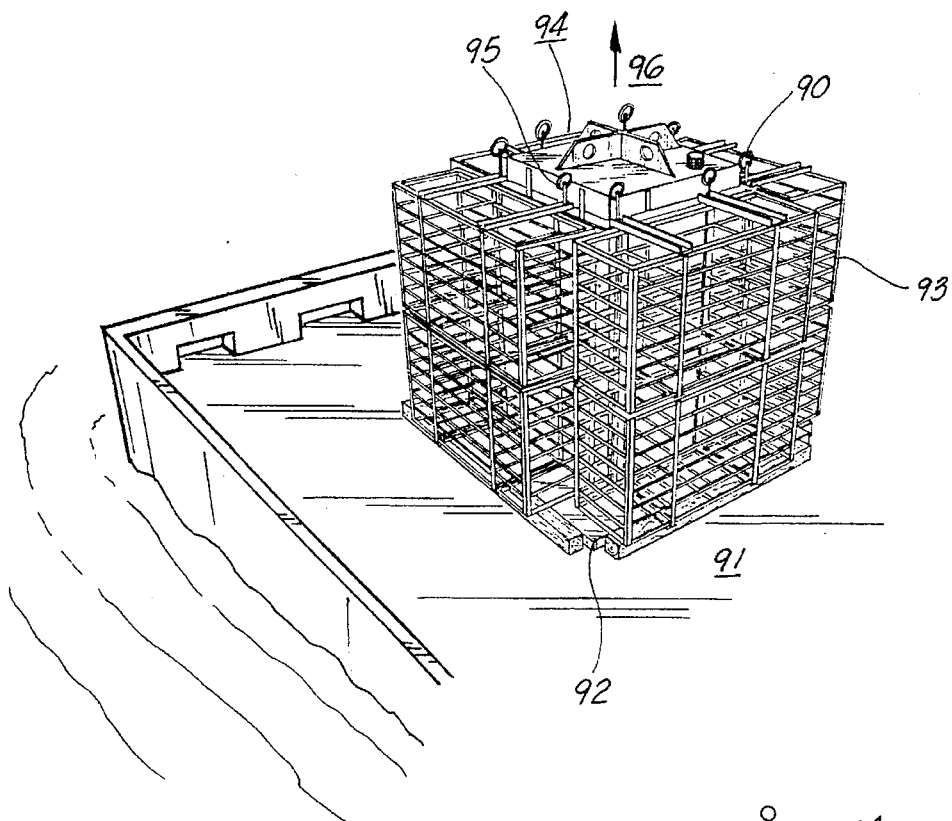
FIG. 5 is a side view of another step in the method of harvesting the oysters from the cleansing/purification cages, illustrating the cage array on the deck of the watercraft, with various vertical facets of said array being removed for harvesting of the contents.

FIG. 5 illustrates the system 90 of the present invention raised out of the water and on a watercraft, such that the support pad 92 of the system rests upon the deck 91, with the racks 93 installed about the central support column 84, with the rods 95 engaging and securing the racks in place. To facilitate removal of the racks, the rods 95 are lifted from the system, disengaging the racks.

Figure 4:
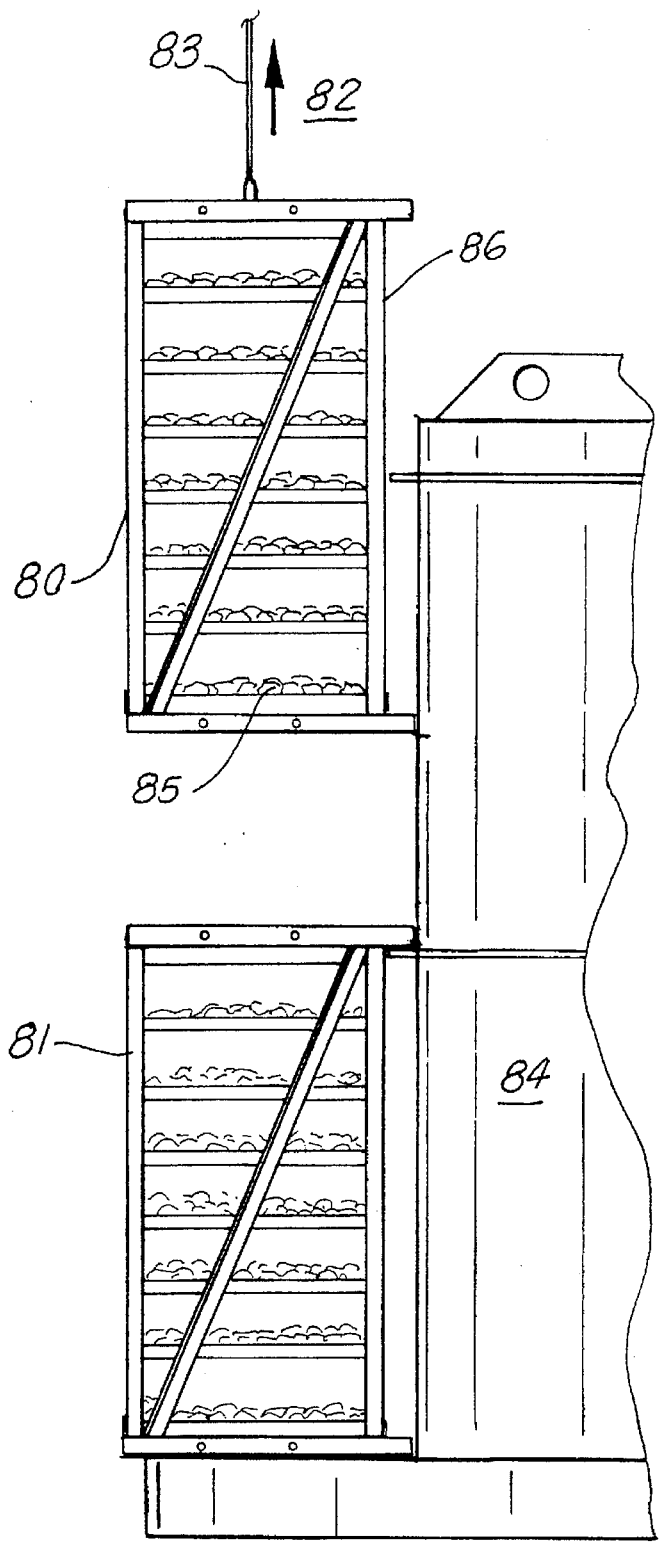
FIG. 4 illustrates a side view of the invention of FIG. 1, illustrating the lifting of a stacked tray rack from the support column for servicing.

Referring to FIG. 4, once on deck, the tray racks 80, 81 containing the trays 85 of molluscaris are lifted 82 via cable 83, forklift (as earlier discussed), or the like, separating the racks from the support column 84, and exposing the open face 86 of the racks to allow removal of the trays 85.

Figure 6:
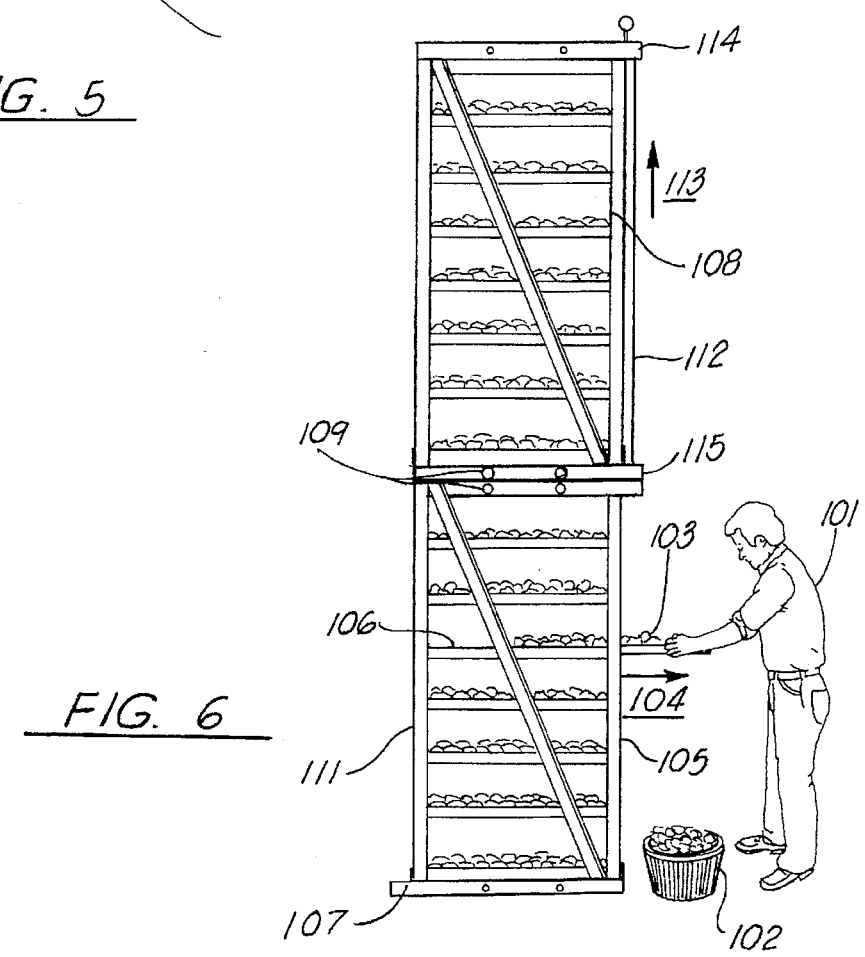
FIG. 6 is a side view of the invention of the preferred embodiment of FIG. 1, wherein there is shown a stack of racks removed from the array, and a tray of mollusks being removed therefrom.

Finally, referring to FIG. 6 of the drawings, the racks 108, 111 (shown vertically joined via brackets 109, although they may be individually separated), having been separated from the support column, are placed on the deck of the watercraft, with the lower engagement bracket engaging said deck. The operator 101 positions himself in front of the open face area 105 of the rack, and grabs and selectively pulls 104 a tray 103 towards him, removing the oysters 102 therefrom, and then moves on to the next tray, until all are emptied. Then, if desired, the trays are likewise restocked, the system reassembled, and the unit repositioned on the seabed in the manner discussed above. Alternatively, the oyster trays can be removed with the oysters thereon, and new trays having unpurified oysters there can be placed into the system once all of the racks are emptied, to prevent the purified oysters from being contaminated via direct or indirect contact with the unpurified oysters.

The racks of the present invention may further include a plurality of longitudinally-aligned, secondary rods 112 which are configured to block the passage of the trays through the open face area of the racks until lifted 113, in which case the user would remove said rods prior to removing the trays, then engaging same once the trays have been reloaded and replaced. The exemplary racks, which are shown holding four vertically-tiered stacks of trays (as shown in FIG. 2) would, therefore, have four such longitudinally-aligned rods running through the open areas of each of said four tiered stacks of trays.

The invention embodiments herein described are done so in detail for exemplary purposes only, and may be subject to many different variations in design, structure, application, and operation methodology. Thus, the detailed disclosures herein should be interpreted in an illustrative, exemplary manner, and not in a limited sense.

What is claimed is:

1. An molluscan sustaining system for supporting a plurality of molluscans on trays in a clean body of water, comprising:

first and second tray rack components, each of said tray rack components each comprising a plurality of generally vertically and horizontally-aligned tray supports, each of said tray rack components having an open face, wherein there is formed open access to a tray placed upon said tray supports, said tray rack components further comprising first and second side walls, and a rear wall, said first and second side walls and rear wall configured to block the passage of trays therethrough;

a platform support structure, comprising a generally horizontally-disposed support pad having an upper side having a medial area and a support area, said platform support structure further comprising:

a generally vertically-situated support column anchored to said support pad, said support column having first and second side walls each having at least one engagement member configured to removeably engage said open face of said first and second tray rack components, respectfully, retaining said open face of said first and second tray rack components in generally closed relationship against said respective side walls of said support column.

2. The molluscan sustaining system of claim 1, wherein said support column has a buoyancy chamber displaced therein, with buoyancy variance means for selectively filling said buoyancy chamber with water or compressed air, in order to vary the buoyancy of the system in the water.

3. The molluscan sustaining system of claim 2, wherein said support column has an upper end, and said buoyancy variance means further comprises connection means for selectively providing compressed air to said buoyancy chamber, said connection means situated at said upper end of said support column.

4. The molluscan sustaining system of claim 3, wherein said buoyancy variance means further comprises a vent means for selectively venting air or water displaced in said buoyancy chamber.

5. The molluscan sustaining system of claim 3, wherein each of said tray rack components further includes at least one engagement bracket situated generally at said open faces of said tray rack components, said at least one engagement bracket situated and configured to engage said at least one engagement member of said respective side walls of said support column.

6. The molluscan sustaining system of claim 5, wherein there is further provided a rod means configured to vertically engage said at least one engagement bracket and said at least one engagement member, said rod means thereby removeably connecting one of said tray rack components to one of said side walls of said support column.

7. The molluscan sustaining system of claim 5, wherein said at least one engagement bracket is situated at upper, medial, and lower areas of each tray rack component.

8. The molluscan sustaining system of claim 7, wherein the engagement bracket situated at said lower area of each tray rack component includes fork-lift engagement means for engaging a fork lift.

9. The molluscan sustaining system of claim 3, wherein said support column further has formed at its upper end cable connection means for allowing the lifting of the system via crane, winch, or the like.

10. The molluscan sustaining system of claim 2, wherein each of said first and second tray rack components comprises a first, lower tray rack module, and a second, upper, removable, tray rack module engaged thereon.

11. The molluscan sustaining system of claim 10, wherein there is further included third and fourth tray rack components, each said third and fourth tray rack components having an open face, and wherein said support column further comprises third and fourth side walls having an engagement member configured to removeably engage said open face of said third and fourth tray rack components, respectfully, retaining said open face of said third and fourth tray rack components in generally closed relationship against said support column.

12. The molluscan sustaining system of claim 1, wherein said support column and tray rack components are of generally equal height, and said tray rack components are of generally equal width.

13. The molluscan sustaining system of claim 12, wherein said support pad emanates from under said support column to form a shelf about each of said side walls, and wherein said shelf is generally about the same width as said tray rack components.

14. The molluscan sustaining system of claim 1, wherein each of said tray rack components further has provided, at their open face area, blocking means for selectively blocking passage of trays through said open face area.

15. The method of sustaining a plurality of molluscans on trays utilizing a clean body of water, comprising the steps of:
   a) providing at least one tray rack component comprising a plurality of generally vertically- and horizontally-aligned tray supports, said at least one tray rack component having an open face area, wherein there is open access to a tray placed upon said tray supports, said at least one tray rack component further comprising first and second side walls, and a rear wall, said first and second side walls and rear wall configured to block the passage of trays therethrough;
   b) providing a platform support structure, comprising a generally horizontally- disposed support pad having an upper side having a medial area and a support area, said platform support constructed of a relatively dense material, said platform support structure further comprising:
      a generally vertically-situated support column anchored to said support pad, said support column having side wall having an engagement member configured to removeably engage said open face of said at least one tray rack component, retaining said open face of said at least one tray rack component in a generally closed relationship against said side wall of said support column;
   c) placing a plurality of molluscans on a tray;
   d) placing said tray with molluscans thereon through said open face area on said at least one tray rack component, onto said tray supports;
   e) placing said open face area of said at least one tray rack component in a face-to-face engagement with said side wall of said support column;
   f) engaging said engagement member of said side wall of said support column, removeably engaging said open face of said at least one tray rack component, retaining said open face of said at least one tray rack component in generally closed relationship against said side wall of said support column;
   g) placing said platform support structure with molluscans loaded on trays therein in a clean body of water;
   h) resting said support pad of said platform support structure on the bottom of said body of water;
   i) allowing said platform support structure to remain in said body of water for a period of time;
   j) allowing said molluscans to utilize said clean body of water;
   k) removing said platform support structure from said body of water;
   l) disengaging said engagement member of said side wall of said support column, disengaging said open face of said at least one tray rack component, releasing said open face of said at least one tray rack component from said side wall of said support column;
   m) moving said open face area of said at least one tray rack component from face-to-face engagement with said side wall of said support column;
   n) removing said tray with molluscans thereon through said open face area from said tray supports of said at least one tray rack component; and
   o) removing the molluscans from said tray.

16. The method of sustaining molluscans of claim 15, wherein in step "b" there is further included the step of providing in said support column a buoyancy chamber, said support column further comprising buoyancy variance means for selectively filling said buoyancy chamber with water or compressed air, in order to vary the buoyancy of the system in the water, and wherein in step "h" there is included the step of utilizing said buoyancy means to gently lower said platform support structure in said body of water.

17. The method of sustaining molluscans of claim 16, wherein in step "k" there is included the further step of utilizing said buoyancy variance means in order to gently raise said platform support structure from the bottom of said body of water, and to raise said platform support structure in said body of water.

18. The method of sustaining molluscans of claim 17, wherein in step "b" there is further included the step of providing in said support column a buoyancy chamber, said support column further comprising buoyancy variance means for selectively filling said buoyancy chamber with water or compressed air, in order to vary the buoyancy of the system in the water, and wherein in step "h" there is included the step of utilizing said buoyancy means to gently lower said platform support structure in said body of water.

19. The method of sustaining molluscans of claim 18, wherein in step "k" there is included the further step of utilizing said buoyancy variance means in order to gently raise said platform support structure from the bottom of said body of water, and to raise said platform support structure in said body of water.

20. The method of sustaining a plurality of molluscans on trays utilizing a clean body of water, comprising the steps of:
   a) providing first and second tray rack components comprising a plurality of generally vertically- and horizontally-aligned tray supports, said first and second rack components each having an open face area, wherein there is open access to a tray placed upon said tray supports, said first and second tray rack components further comprising first and second side walls, and a rear wall, said first and second side walls and rear wall configured to block the passage of trays therethrough;
   b) providing a platform support structure, comprising a generally horizontally- disposed support pad having an upper side having a medial area and a support area, said platform support constructed of a relatively dense material, said platform support structure further comprising:

a generally vertically-situated support column anchored to said support pad, said support column having first and second side walls each having an engagement member configured to removeably engage said open face of said first and second tray rack components, respectfully, retaining said open face of said first and second tray rack components in generally closed relationship against said respective side walls of said support column;

c) placing a plurality of molluscans on first and second trays;

d) placing said first tray with molluscans thereon through said open face area on said first tray rack component, onto said first tray rack component tray supports, and placing said second tray with molluscans thereon through said open face area on said second tray rack component, onto said second tray rack component tray supports;

e) placing said open face area of said first tray rack component in a face-to-face engagement with said first side wall of said support column, placing said open face area of said second tray rack component in a face-to-face engagement with said second side wall of said support column;

f) engaging said engagement member of said first side wall of said support column, removeably engaging said open face of said first tray rack component, retaining said open face of said first tray rack component in generally closed relationship against said first side wall of said support column, then engaging said engagement member of said second side wall of said support column, removeably engaging said open face of said second tray rack component, retaining said open face of said second tray rack component in generally closed relationship against said second side wall of said support column;

g) placing said platform support structure with molluscans loaded on trays therein in a clean body of water;

h) resting said support pad of said platform support structure on the bottom of said body of water;

i) allowing said platform support structure to remain in said body of water for a period of time;

j) allowing said molluscans to utilize said clean body of water;

k) removing said platform support structure from said body of water;

l) disengaging said engagement member of said first side wall of said support column, disengaging said open face of said first tray rack component, releasing said open face of said first tray rack component from said side wall of said support column, then disengaging said engagement member of said second side wall of said support column, disengaging said open face of said second tray rack component, releasing said open face of said second tray rack component from said side wall of said support column;

m) moving said open face area of said first tray rack component from a face-to-face engagement with said first side wall of said support column, and moving said open face area of said second tray rack component from a face-to-face engagement with said second side wall of said support column;

n) removing said first and second trays with molluscans thereon through said open face area from said tray supports of said first and second tray rack component; and o) removing the molluscans from said first and second trays.

* * * * *